Sept. 24, 1957  R. T. FLORA  2,807,191
VIEWING DEVICE FOR USE WITH THREE-DIMENSIONAL STILL FILM
Filed Oct. 22, 1953  2 Sheets-Sheet 1
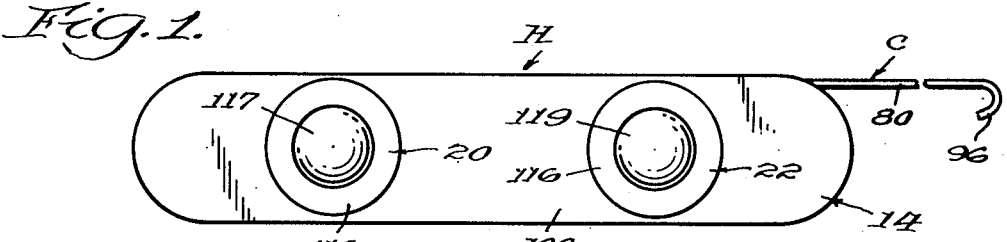
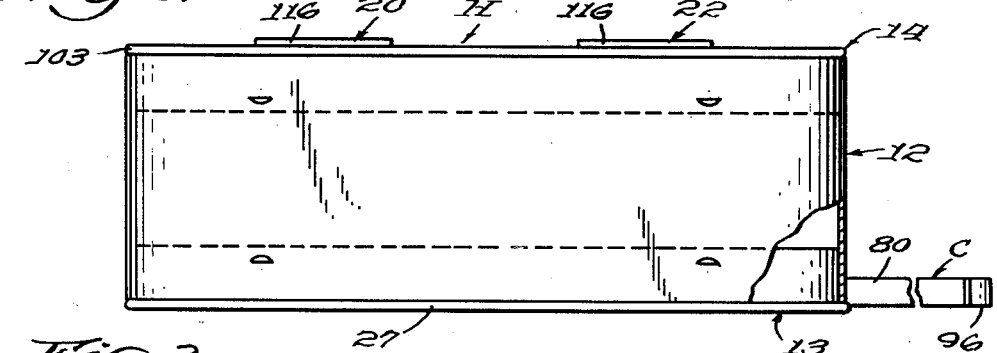
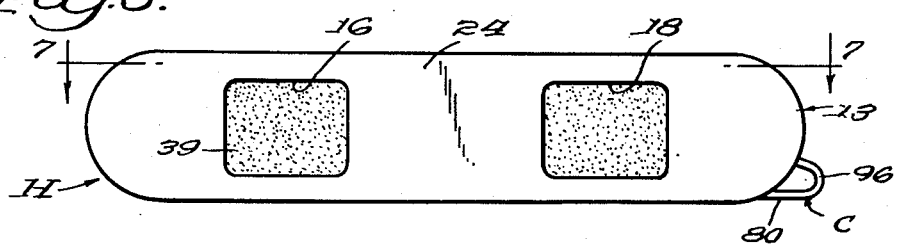
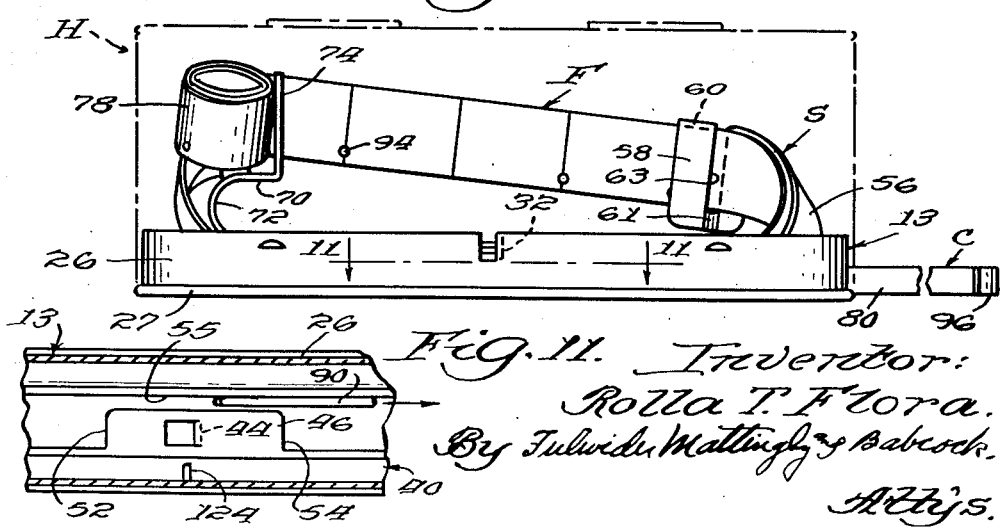
Inventor:
Rolla T. Flora.
By Tulwiler, Mattingly & Babcock.
Attys.

Sept. 24, 1957 R. T. FLORA 2,807,191
VIEWING DEVICE FOR USE WITH THREE-DIMENSIONAL STILL FILM
Filed Oct. 22, 1953 2 Sheets-Sheet 2
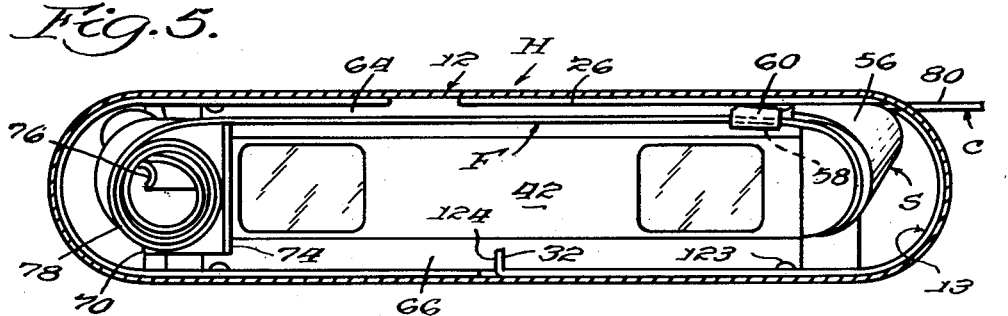
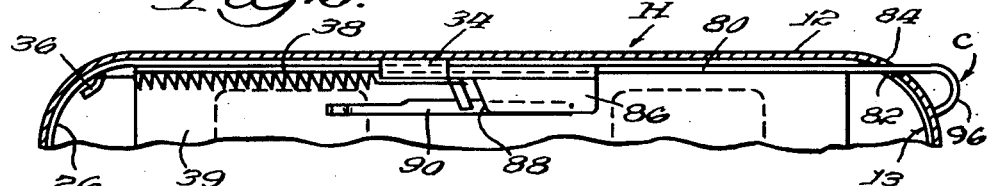
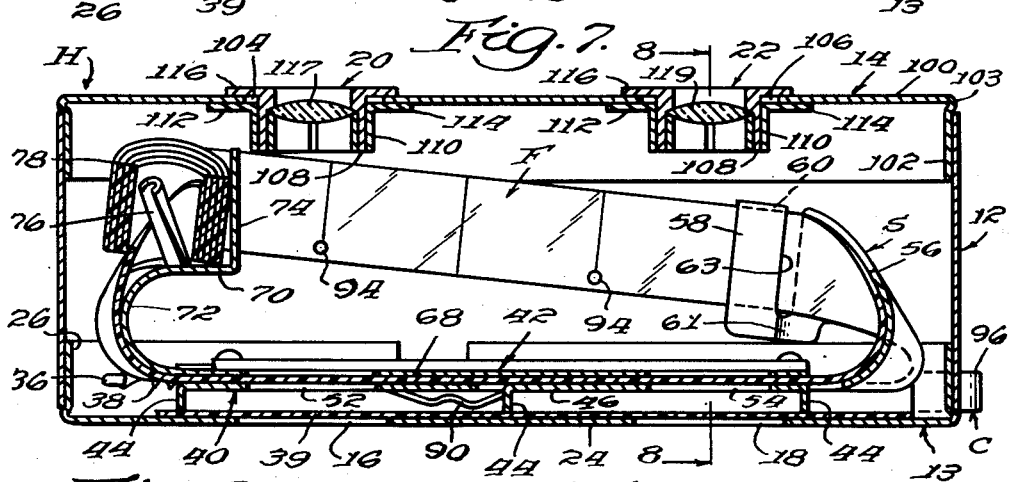
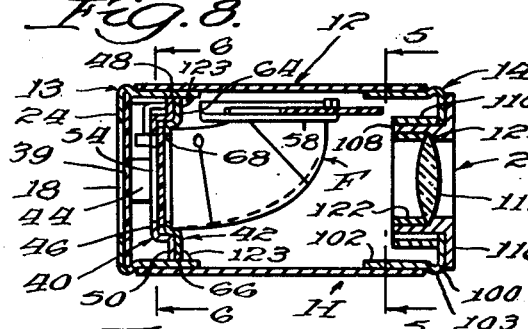
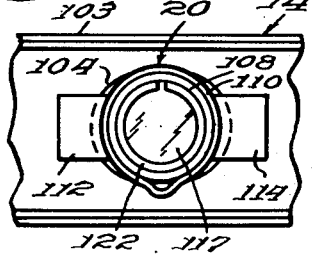
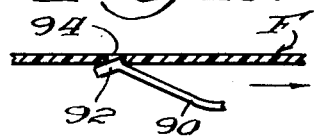
Inventor:
Rolla T. Flora
By Tulmidy, Mattingly & Babcock
Atty's.

United States Patent Office 2,807,191
Patented Sept. 24, 1957

2,807,191

VIEWING DEVICE FOR USE WITH THREE-DIMENSIONAL STILL FILM

Rolla T. Flora, Burbank, Calif.

Application October 22, 1953, Serial No. 387,561

6 Claims. (Cl. 88—31)

The present invention relates generally to the field of photography and more particularly to an improved viewing device for use with three-dimentional still pictures.

Although there have been heretofore proposed several types of viewing devices for use with three-dimensional still pictures, such devices incorporate certain disadvantages. Perhaps the most serious disadvantage of these heretofore proposed devices lies in their film-holding arrangement. Thus, a common type of viewing device incorporates a cardboard disc wherein are mounted a plurality of circumferentially spaced film frames. Because of size limitations, the number of such frames must be quite limited. Additionally, since the frames are exposed, they are susceptible to damage from light, moisture and careless handling. Another type of viewing device utilizes a strip of film frames, which strip is mounted within the interior of the device. The strip of film is moved across the eyepieces of the viewer, a single picture at a time with a step-by-step motion. A major disadvantage of this arrangement is that it is necessary to re-wind the film strip after each time that it has been run through the viewer. The mechanism required for carrying out such re-winding operation is comparatively bulky, adds to the cost of the viewer, and is subject to wear.

A major object of the present invention is to provide an improved viewing device for simultaneously viewing two matching images of a three-dimensional still picture.

Another object is to provide a viewing device having a unique film-holding structure for supporting a continuous loop of film whereon are imprinted a plurality of individual images.

A further object of the invention is to provide a viewing device of the aforedescribed nature which permits the film images to be re-run before the eyes of the operator without rewinding the film.

Yet another object is to provide a viewing device that is simple of design having but few working parts, and which is rugged of construction whereby it may have a long and useful service life.

It is a further object to provide a viewing device which may be fabricated from readily obtainable materials and by simple manufacturing processes in order that it may be economically produced for sale at a comparatively low price.

An additional object of the invention is to provide a viewing device of the aforedescribed nature that is foolproof in operation, having but a single control to be manipulated whereby even a child may readily effect the changing of the film images.

Another object is to provide a viewing device having simple means for adjusting the interocular distance between its eye pieces to fit the requirements of different operators.

A more particular object of the present invention is to provide a viewing device of the aforedescribed nature that houses a strip of film within an enclosure completely sealed from contact with direct light, moisture, and the fingers of an operator.

Yet a further object is to provide a viewing device of the aforedescribed nature having a maximum capacity of individual pictures for a given size of device and picture.

These and other objects and advantages of the present invention will become apparent from the following detailed description of a preferred embodiment thereof, when taken in conjunction with the appended drawings wherein:

Figure 1 is a rear elevational view of a preferred form of viewing device embodying the present invention;

Figure 2 is a top plan view of said device, one corner thereof being partially cut away;

Figure 3 is a front view of said device;

Figure 4 is a top plan view showing the film-holding structure of said device;

Figure 5 is a vertical sectional view taken on line 5—5 of Figure 8;

Figure 6 is a fragmentary vertical sectional view taken on line 6—6 of Figure 8;

Figure 7 is an enlarged, horizontal sectional view taken on line 7—7 of Figure 2;

Figure 8 is a vertical sectional view taken on line 8—8 of Figure 7;

Figure 9 is a fragmentary elevational view showing the manner of mounting one of the eye pieces of said device;

Figure 10 is a fragmentary enlarged view of a detail of said device; and,

Figure 11 is a reduced fragmentary vertical sectional view taken on line 11—11 of Figure 4.

Referring to the drawings, the preferred form of viewing device embodying the present invention includes a three piece housing H having a main case, generally designated 12, a front closure, generally designated 13, and a rear closure, generally designated 14. The front closure 13 mounts a film-holding structure S adapted to carry a continuous roll of film F; the length of which film is imprinted with a plurality of matched pairs of individual picture images. The front closure 13 is formed with a pair of apertures 16 and 18 for admitting light through the film strip F. The rear closure 14 mounts a pair of eye-pieces 20 and 22 that are in alignment with the apertures 16 and 18, respectively, through which eye-pieces the pairs of images on the film strip may be viewed. A film changer C is mounted by the front closure 13 and is adapted to effect a step-by-step movement of the film strip F past the apertures and eye-pieces.

It should be particularly observed that the viewing device shown and described herein is especially adapted for use in conjunction with the three-dimensional still camera covered by my co-pending application for United States Letters Patent, Serial No. 410,141, filed February 15, 1954, now Patent No. 2,723,609, issued Nov. 15, 1955, and entitled "Camera for Taking Three-Dimensional Still Pictures." The camera described therein is capable of taking a plurality of individual matched pairs of stereoscopic images upon a roll of film, which pairs of images will be spaced at the interocular distance of a normal viewer. Hence, when this film is developed, the pairs of images will have the desired interocular spacing. It may be assumed that the film strip F is imprinted with a plurality of pairs of stereoscopic images taken by a camera covered by my above-identified application, each pair of images being spaced apart the distance between the eye pieces 20 and 22 of the viewing device. The film strip F may, however, be imprinted with pairs of images taken by other types of cameras.

Referring again to the appended drawings for a more particular description of the preferred form of viewing device, the main case 12, front closure 13, and rear closure 14 thereof, will preferably be formed of sheet metal, however, other suitable materials, as for example, plastic, or die-cast metal, may be utilized. The main case 12 is open at its front and rear ends. The front closure 13 includes a flat, vertical wall 24 from the edges of which extend a rearwardly directed peripheral flange 26. This flange 26 is recessed slightly from the outermost edge of the wall 24 and has somewhat smaller overall dimensions than the inner periphery of the main case 12 whereby there is defined a peripheral bead 27. The flange 26 may be telescopically urged within the front portion of the main case, as indicated in Figure 8 and retained in place by frictional engagement of the flange with the front portion of the main case. The intermediate part of the lower portion of the flange 26 includes an upstanding lug 32 which is formed by first slitting and then bending upwardly a rectangular section of the flange, as shown in Figures 4 and 5. The intermediate part of the upper portion of the flange 26 includes a forwardly extending lug 34 which is formed in a similar manner, as shown in Figure 6. Yet a third lug 36 is formed at one side of the upper part of the flange 26. This latter lug 36 extends downwardly and inwardly and serves as an anchor for one end of a spring 38, as indicated in Figure 6. The apertures 16 and 18 may be covered with a suitable translucent, light-diffusing material 39. This material 39 may take the form of a generally rectangular sheet that is shown abutting the rear surface of the wall 24 of front closure 13.

The film-holding structure S includes a vertically extending spacer plate, generally designated 40, and a guide plate, generally designated 42, the latter being disposed parallel to the spacer plate rearwardly thereof, as shown in Figures 7 and 8. The spacer plate 40 is maintained a desired distance away from the wall 24 of the front closure 13 and parallel thereto by forwardly extending flaps 44. These flaps 44 may be integrally formed upon the spacer plate by stamping out a rectangular section of the spacer plate's center element 46. These flaps 44 serve to retain the sheet of translucent, material 39 in place against the rear of the front closure wall 24. As shown in Figure 8, extending vertically from the top and bottom of the center element 46 of the spacer plate are elongated horizontally extending mounting flanges 48 and 50. The center element 46 is also formed with a pair of generally rectangular apertures 52 and 54 which are aligned with the apertures 16 and 18, respectively, of the front closure 13. As shown in Figure 11, the upper portions of these apertures 52 and 54 are connected by a perforation-exposing slot 55. Extending outwardly from one side of the spacer plates center element 46 is a film-reversing member 56. This film-reversing member is an integral extension of the spacer plate and is curved rearwardly and upwardly from its point of connection to the center element thereof. The rear of the film-reversing member 56 is formed with a rearwardly and downwardly inclined guide finger 58, which finger is vertically spaced from the rear of the film-reversing member a distance slightly greater than the thickness of the film strip F. An upstanding lug 60 is formed at the rear end of the guide finger, as shown in Figure 5. The guide finger is integrally connected to the film-reversing member at its front end by a short downwardly inclined connection element 61 so as to define a film strip-receiving slot 63. A slot 61a is defined between the free end of the strip 57 and the guide finger 58.

The guide plate 42 includes a center element 62 from the top and bottom of which extend elongated horizontally extending mounting flanges 64 and 66. As shown in Figure 8, these mounting flanges abut the mounting flanges 48 and 50 of the spacer plate. It will be observed that the rear surface of the spacer plate's center element 46 is spaced forwardly of the front surface of the guide plate's center element 62 whereby there is defined a track 68. This track 68 slidably receives the film strip F whereby this strip may be moved across the front of the viewing device. Extending from the side of the guide plate's center element 62 opposite the film-reversing member 56 is a film winding member 70. This film winding member is an integral extension of the guide plate and includes a front section 72 that curves rearwardly and then inwardly towards the center of the main case 12. From the free end of this section 72 extends a rearwardly directed vertical abutment plate 74. A rearwardly and outwardly extending support leg 76 is formed upon the front section 72 outwardly of the abutment plate 74, as indicated in Figure 7.

As mentioned previously herein, the film strip F is in the form of a continuous loop, and in order that an appreciable number of individual sets of matched images may be imprinted upon this strip, the loop must be of a comparatively large diameter. Because of space limitations within the housing H, it is necessary that a portion of the film strip loop be wound about itself in the form of a roll 78. This roll 78 encompasses the support leg 76 of the guide plate 42, as indicated in Figure 7. The innermost loop of the roll 78 extends forwardly along the outside surface of the front section 72 of the guide plate, and into the adjacent end of the track 68. The film strip extends across the front of the viewer from this point emerging from the opposite end of the track 68 adjacent the front of the film-reversing member 56. The film strip then extends rearwardly and upwardly along the inner surface of the film-reversing member 56. During its travel along the latter, the transverse axis of the film strip is caused to change from a vertical inclination to a generally horizontal inclination. The film strip is also caused to reverse its direction of movement during its travel along the latter member. This is accomplished without creating other than minor friction between the film and the film-reversing member because of the particular rearward and upward curvature of the latter. The film strip is restrained against forward or rearward movement relative to the film-reversing member 56 by the lug 60 and the connection element 61, the film strip passing over the top surface of the guide finger 58. From the guide finger, the film strip extends horizontally across the intermediate portion of the main case 12 and enters the outermost loop of the roll 78. As this portion of the film strip enters the outermost loop of the roll 78, the portion of the film strip disposed in the inner loop thereof will be pulled away from the roll. Accordingly, the roll will be constantly maintained with substantially an equal number of loops. The path followed by the film strip is clearly shown in Figure 7.

The film changer C includes an elongated base element 80 which is slidably supported at the intermediate portion of the viewer between the lug 34 and the underside of the upper part of the front closure flange 26, as shown in Figure 6. The opposite side of this base element 80 extends through, and is slidably supported within, aligned apertures 82 and 84 formed at one side of the front closure flange 26 and the main case 12, respectively. The intermediate portion of the film changer base element 80 is formed with a depending ear 86, which ear includes a spring-anchoring slot 88. The tension spring 38 is disposed between the latter slot 88 and the lug 36, as shown in Figure 6, and serves to constantly bias the film changer C to a retracted position relative to the housing H. The lower portion of the ear 86 rigidly mounts an elongated puller element 90 having a hook 92 formed at its free end. The puller element 90 is formed of a resilient material and is sufficiently bowed that it will be constantly biased rearwardly towards the portion of the film strip F disposed in the track 68. The hook 92 is adapted to engage perforations 94 formed along one side of the film strip, as shown in Figure 10. The end of the base element 80, exterior of the main case, is formed into a handle 96 that is adapted to be manipulated by the operator of the viewing device.

The rear closure 14 is generally similar in configuration to the front closure 13 and includes a flat vertical wall 100 from the edges of which extends a forwardly directed peripheral flange 102. The flange 102 has somewhat smaller overall dimensions than the inner periphery of the main case 12 whereby there is defined a peripheral bead 103. The flange 102 may be telescopically urged within the rear portion of the main case 12, as indicated in Figure 8. As shown in Figure 7, the wall 100 is formed with a pair of generally elongated apertures 104 and 106 wherein are disposed the lens-holding tubes 108 of the eye-pieces 20 and 22. Figure 9 is an elevational view of one of the eye-pieces 20 and referring thereto it will be observed that the lens-holding tubes 108 are each tightly encompassed by a ring member 110 which is formed with a pair of diametrically opposed ears 112 and 114. The ears are constantly biased rearwardly relative to the main portion of the ring member whereby they tend to urge the tubes 108 forwardly relative to the wall 100. Actual forward movement of these tubes, however, is resisted by the integral radially extending annular flanges 116 formed at the rear of each tube 108. With this arrangement, the eye-pieces 20 and 22 will be slidably disposed within the apertures 104 and 106 with regard to sideward movement; the portion of the wall 100 adjacent the apertures 104 and 106 being pinched between the annular elements 116 and the ears 112 and 114. Accordingly, the eye-pieces may be set at any desired interocular distance, by merely exerting a slight amount of sideward force thereon. The exact amount of such force may be varied by bending the ears 112 and 114 either forwardly or rearwardly. The lenses 116 and 119 of the eye-pieces will preferably be of the double convex type, although other types of lenses may be utilized. The lenses are held against an annular shoulder 121 formed on the tubes 108 by a snap ring 122.

Although it is possible to periodically disassemble the viewing device for changing the film strip F, it is contemplated that the cost of the device will be sufficiently low that a separate viewer may be provided for each film strip. This is possible because of the extremely simple construction thereof. In assembling the device, the mounting flanges 48 and 50 of the spacer plate 40 are suitably joined to the mounting flanges 64 and 66 of the guide plate 42. Thereafter, this assembly is urged forwardly into the front closure 13; the spring 38 having had its opposite ends hooked over lug 36 and forced within slot 88. This assembly will preferably be retained within the front closure 13 by a plurality of small tabs 123 that are punched from the flange 26, as indicated in Figures 7 and 8. It should be noted that the mounting flanges 59 and 66 of the spacer and guide plates are formed with aligned vertically extending slots 124, as indicated in Figure 11. As the spacer and guide plate assembly is urged forwardly within the front closure, these slots 124 receive the upstanding lug 34 of the lower part of the flange 28. In this manner, the spacer and guide plate assembly is positively positioned within the front closure. Moreover, this assembly will be rigidly maintained in such position, during the life of the viewing device. Before the spacer and guide plate assembly is urged into the front closure, the hook 92 of the film changer C may be engaged with one of the perforations 94 of the film strip F. To complete assembly of the device, the rear closure 14 is urged into the rear portion of the main case 12.

As mentioned previously herein, the individual frames of the film strip F are so spaced that a corresponding pair thereof will be simultaneously positioned in front of the apertures 16 and 18, and the eye-pieces 20 and 22. Inasmuch as each pair of matched images cooperate to produce a single stereoscopic picture, the operator will view such picture when looking through the eye-pieces. To view another picture, it is only necessary to grasp the handle 96 of the film changer C and pull it outwardly relative to the main case 12, as indicated by the arrow in Figures 7, 10, and 11. Referring to the latter figure, such outward movement of the film changer will cause the hook 92 to pull the film strip across the track 68, clearance for the hook being provided by the slot 55 of the spacer plate 40. One of the perforations 94 is formed in the film strip F for each pair of images, hence, such movement of the film strip will position the next pair of images in front of the eye-pieces. When the handle 96 is released, the spring 38 will automatically return it to its original position.

As noted previously hereinbefore, when the film strip F passes through the track 68, it is automatically simultaneously unwound and rewound relative to the roll 78. Hence, it is never necessary to manually re-wind the film strip. Additionally, this strip is protected from exposure to direct light, moisture, dirt, and careless handling. Should it ever be desired to replace the film strip and/or the spring 38, it is only necessary to withdraw the front closure 13 from the main case 12. Thereafter, the front closure may be reassembled in the manner described previously hereinbefore.

While there has been shown and described what is presently considered to be a preferred embodiment of the present invention, it will be apparent that various modifications and changes may be made thereto without departing from the spirit of the invention and the scope of the following claims.

I claim:

1. A viewing device for use with a loop of film strip imprinted with a plurality of pairs of matched images, said strip including a portion which is wrapped about itself into a roll, comprising: an enclosed housing; a pair of light-admitting apertures formed in the front of said housing; a pair of eye-pieces formed in the back of said housing in substantial alignment with said apertures; a film-holding structure mounted within said housing that includes a track extending across the front portion of said housing behind said apertures and slidably receives said film strip; a film-winding member that is a part of said film holding structure and includes a front section which curves rearwardly and inwardly from one side of said track, a rearwardly directed abutment plate connected to said front section, and a generally rearwardly directed support leg formed on said front section outwardly of said abutment plate for receiving the innermost loop of said roll; a film-reversing member that is a part of said film-holding structure and which curves rearwardly and upwardly from the opposite side of said track, said film-reversing member including a generally rearwardly directed guide finger which is vertically spaced from its rear end and which has an upstanding lug at its rear portion, said film strip extending from the innermost loop of said roll forwardly and inwardly around the outside of said front section, across said track, rearwardly and upwardly around the inside of said film-reversing member, through the vertical space between the rear of the latter member and the guide finger forwardly of said lug, then across the intermediate portion of said housing into the outermost loop of said roll; and, a film changer mounted by said housing for connection to said film strip, said film changer being adapted to effect a step-by-step movement of said strip through said track past said apertures, said strip being automatically unwound from the innermost loop of said roll and rewound into the outermost loop thereof by said movement.

2. A viewing device for use with a loop of film strip imprinted with a plurality of pairs of matched images and formed with perforations along its length, said film strip including a portion which is wrapped about itself into a roll, comprising: an enclosed housing; a pair of light-admitting apertures formed in the front of said housing; a pair of eye-pieces formed in the back of said housing in substantial alignment with said apertures; a film-holding structure mounted within said housing that includes a track extending across the front portion of said housing behind said apertures and slidably receives said film strip; a film-winding member that is a part of said film-holding structure and includes a front section which curves rearwardly and inwardly from one side of said track, a rearwardly directed abutment plate connected to said front section, and a generally rearwardly directed support leg formed on said front section outwardly of said abutment plate for receiving the innermost loop of said roll; a film-reversing member that is a part of said film-holding structure and which curves rearwardly and upwardly from the opposite side of said track, said film-reversing member including a generally rearwardly directed guide finger which is vertically spaced from its rear end and which has an upstanding lug at its rear portion, said film strip extending from the innermost loop of said roll forwardly and inwardly around the outside of said front section, across said track, rearwardly and upwardly around the inside of said film-reversing member, through the vertical space between the rear of the latter member and the guide finger forwardly of said lug, then across the intermediate portion of said housing into the outermost loop of said roll; and, a film changer that includes a base element slidably mounted behind said apertures for reciprocal movement parallel with said track, a resilient elongated puller element mounted at one of its ends to said base element with its free end constantly biased rearwardly toward said track, a hook formed on the free end of said puller element for successively engaging the perforations of said film strip, and spring means constantly biasing said base element toward one side of said housing.

3. A viewing device for use with a loop of film strip imprinted with a plurality of pairs of matched images and formed with perforations along its length, said film strip including a portion which is wrapped about itself into a roll, comprising: an enclosed housing that includes an open-ended main case, a front closure having a vertical wall from the edges of which extend a rearwardly directed peripheral flange that is telescopically attachable to the front of said main case, and a rear closure having a vertical rear wall from the edges of which extend a forwardly directed peripheral flange that is telescopically attachable to the rear of said main case; a pair of light-admitting apertures formed in the vertical wall of said front closure; a pair of eye-pieces mounted in the vertical wall of said rear closure in substantial alignment with said apertures; a film-holding structure mounted by said front closure that includes a track extending across the front portion of said housing behind said apertures through which said film strip may be moved, a film-winding member extending rearwardly from one side of said track and having a support leg which may be encircled by the innermost loop of a portion of said film strip which is wrapped about itself into a roll, and a film-reversing member extending rearwardly from the opposite side of said track and having means for reversing the direction of movement and the inclination of the transverse axis of said film strip whereby it may pass across said housing and be freely wound into the outermost loop of said roll; and a film changer mounted by said housing for connection to said film strip, said film changer being adapted to effect a step-by-step movement of said strip through said track past said apertures, said strip being automatically unwound from the innermost loop of said roll and rewound into the outermost loop thereof by said movement.

4. A viewing device for use with a loop of film strip imprinted with a plurality of pairs of matched images and formed with perforations along its length, said film strip including a portion which is wrapped about itself into a roll, comprising: an enclosed housing that includes an open-ended main case, a front closure having a vertical wall from the edges of which extend a rearwardly directed peripheral flange that is telescopically attachable to the front of said main case, and a rear closure having a vertical rear wall from the edges of which extend a forwardly directed peripheral flange that is telescopically attachable to the rear of said main case; a pair of light-admitting apertures formed in the vertical wall of said front closure; a pair of eye-pieces mounted in the vertical wall of said rear closure in substantial alignment with said apertures; a film-holding structure mounted within said housing that includes a track extending across the front portion of said housing behind said apertures and slidably receives said film strip; a film-winding member that is a part of said film-holding structure and includes a front section which curves rearwardly and inwardly from one side of said track, a rearwardly directed abutment plate connected to said front section, and a generally rearwardly directed support leg formed on said front section outwardly of said abutment plate for receiving the innermost loop of said roll; a film-reversing member that is a part of said film-holding structure and which curves rearwardly and upwardly from the opposite side of said track, said film-reversing member including a generally rearwardly directed guide finger which is vertically spaced from its rear end and which has an upstanding lug at its rear portion, said film strip extending from the innermost loop of said roll forwardly and inwardly around the outside of said front section, across said track, rearwardly and upwardly around the inside of said film-reversing member, through the vertical space between the rear of the latter member and the guide finger forwardly of said lug, then across the intermediate outermost loop of said roll; and, a film changer that includes an elongated base element which is slidably mounted by said front closure for reciprocal movement relative to said track, a resilient elongated puller element mounted at one of its ends to said base element with its free end constantly biased rearwardly toward said track, a hook formed on the free end of said puller element for successively engaging the perforations of said film strip, and spring means constantly biasing said base element toward one side of said housing, said base element protruding through one side of said front closure whereby it may be manually urged toward the opposite side of said front closure and thereby effect step-by-step movement of said film strip through said track.

5. A viewing device for use with a loop of film strip imprinted with a plurality of pairs of matched images and formed with perforations along its length, said film strip including a portion which is wrapped about itself into a roll, comprising: an enclosed housing that includes an open-ended main case, a front closure having a vertical wall from the edges of which extend a rearwardly directed peripheral flange that is telescopically attachable to the front of said main case, and a rear closure having a vertical rear wall from the edges of which extend a forwardly directed peripheral flange that is telescopically attachable to the rear of said main case; a pair of light-admitting apertures formed in the vertical wall of said front closure; a pair of eye-pieces mounted in the vertical wall of said rear closure in substantial alignment with said apertures; a sheet of light-diffusing material extending across the rear surface of the vertical wall of said front closure; a spacer plate held spaced away from the rear of said sheet by a plurality of integral forwardly extending flaps, said spacer plate being formed with a pair of apertures aligned with the first-mentioned apertures and a perforation-exposing slot connecting said apertures; a film-reversing member that curves rearwardly and upwardly from one side of said spacer plate; a rearwardly and downwardly inclined guide finger at the rear of said latter member connected thereto at its front end by a short downwardly inclined element so as to define a film strip-receiving slot; an upstanding lug formed at the rear of said guide finger; a guide plate abutting the rear of said spacer plate and formed with a pair of apertures that are aligned with the aforementioned apertures, said plates cooperating to define a track for slidably receiving said film strip; a film-winding member that includes a front section which curves rearwardly and inwardly from the side of said track opposite said film-reversing member as an integral extension of said guide plate, a rearwardly directed abutment plate connected to said front section, and a rearwardly and outwardly directed support leg formed on said front section outwardly of said abutment plate for receiving the innermost loop of said roll, said film strip extending from the innermost loop of said roll forwardly and inwardly around the outside of said front section, across said track, rearwardly and upwardly around the inside of said film-reversing member, through the film receiving slot between the rear of the latter member and the guide finger forwardly, of said lug, then across the intermediate portion of said housing into the outermost loop of said roll; and a film changer that includes a base element slidably mounted by said front closure for reciprocal movement parallel with said track, a resilient elongated puller element mounted at one of its ends to said base element with its free end constantly biased toward said track, a hook formed on the free end of said puller element that extends through said perforation-exposing slot so as to successively engage the perforations of said film strip, and spring means interposed between said front closure and said base element for constantly urging said base element toward one side of said housing, said base element protruding through one side of said front closure whereby it may be manually urged toward the opposite side of said front closure and thereby effect step-by-step movement of said film strip through said track.

6. A viewing device for use with a loop of film strip imprinted with a plurality of pairs of matched images and formed with perforations along its length, said film strip including a portion which is wrapped about itself into a roll, comprising: an enclosed housing that includes an open-ended main case, a front closure having a vertical wall from the edges of which extend a rearwardly directed peripheral flange that is telescopically attachable to the front of said main case, and a rear closure having a vertical rear wall from the edges of which extend a forwardly directed peripheral flange that is telescopically attachable to the rear of said main case; a pair of light-admitting apertures formed in the vertical wall of said front closure; a pair of eye-pieces mounted in the vertical wall of said rear closure in substantial alignment with said apertures; a sheet of light-diffusing material extending across the rear surface of the vertical wall of said front closure; a spacer plate held spaced away from the rear of said sheet by a plurality of integral forwardly extending flaps, said spacer plate being formed with a pair of apertures aligned with the first-mentioned apertures and a perforation-exposing slot connecting said apertures; a film-reversing member that curves rearwardly and upwardly from one side of said spacer plate; a rearwardly and downwardly inclined guide finger at the rear of said latter member connected thereto at its front end by a short downwardly inclined element so as to define a film strip-receiving slot; an upstanding lug formed at the rear of said guide finger; a guide plate abutting the rear of said spacer plate and formed with a pair of apertures that are aligned with the aforementioned apertures, said plates cooperating to define a track for slidably receiving said film strip; vertically extending slots formed in said spacer plate and said guide plate; a vertical lug formed on said front closure for insertion within said aligned slots; a plurality of tabs punched from said front closure for abutting the rear of said guide plate to retain it in place; and, a film changer that includes an elongated base element which extends through aligned openings formed in one side of said front closure and main case, the intermediate portion of said base element being slidably mounted by a lug stamped from said front closure for reciprocal movement parallel with said track, a resilient elongated puller element mounted at one of its ends to said base element with its free end constantly biased toward said track, a hook formed on the free end of said puller element that extends through said perforation-exposing slot so as to successively engage the perforations of said film strip, and a tension spring interconnecting said base element and a lug stamped from said front closure for constantly biasing said base element to a retracted position relative to said main case.

References Cited in the file of this patent
UNITED STATES PATENTS

| | | |
|---|---|---|
| 1,814,588 | De Vault | July 14, 1931 |
| 2,311,204 | Bouma | Feb. 16, 1943 |
| 2,326,718 | Mast | Aug. 10, 1943 |
| 2,432,200 | Lasky et al. | Dec. 9, 1947 |
| 2,484,591 | Rochwite | Oct. 11, 1949 |